United States Patent [19]
Berends

[11] 3,791,674
[45] Feb. 12, 1974

[54] KINGPIN ASSEMBLY
[75] Inventor: Howard P. Berends, Fruitport, Mich.
[73] Assignee: Holland Hitch Company, Holland, Mich.
[22] Filed: May 30, 1972
[21] Appl. No.: 257,576

[52] U.S. Cl. .......... 280/433, 280/491 B, 280/423 R
[51] Int. Cl. .......................................... B62d 53/08
[58] Field of Search ........................... 280/433, 405

[56] References Cited
UNITED STATES PATENTS

| | | | |
|---|---|---|---|
| 3,082,020 | 3/1963 | Hulverson et al. | 280/433 R |
| 2,981,555 | 4/1961 | Abolins | 280/433 R |
| 3,031,206 | 4/1962 | Shinn | 280/433 R |
| 2,831,704 | 4/1958 | Tenenbaum | 280/433 X |
| 3,254,904 | 6/1966 | Jewell | 280/433 R |
| 3,135,528 | 6/1964 | Martin | 280/433 R |
| 2,494,799 | 1/1950 | Duvall et al. | 280/433 R |

Primary Examiner—Leo Friaglia
Assistant Examiner—Randall A. Schrecengost
Attorney, Agent, or Firm—Price, Heneveld, Huizenga & Cooper

[57] ABSTRACT

A kingpin assembly includes a kingpin pivotally coupled to recessed mounting means positioned with an aperture in a relatively flat surface of a vehicle. The kingpin is movable between a locked upright position during use to a horizontal stored position when not in use. A locking mechanism is also pivotally coupled to the recessed mounting means and provides the dual function of covering the recessed mounting means when the kingpin is in its stored position therein and locking the kingpin in the upright position during use. The locking mechanism includes a shoulder portion adapted to aid in lifting the kingpin from its stored position to its upright position.

19 Claims, 7 Drawing Figures

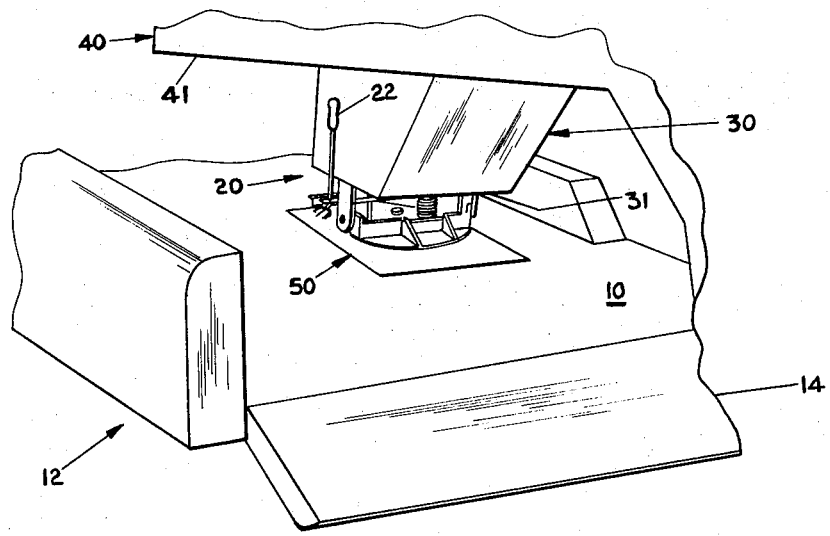
FIG. 1
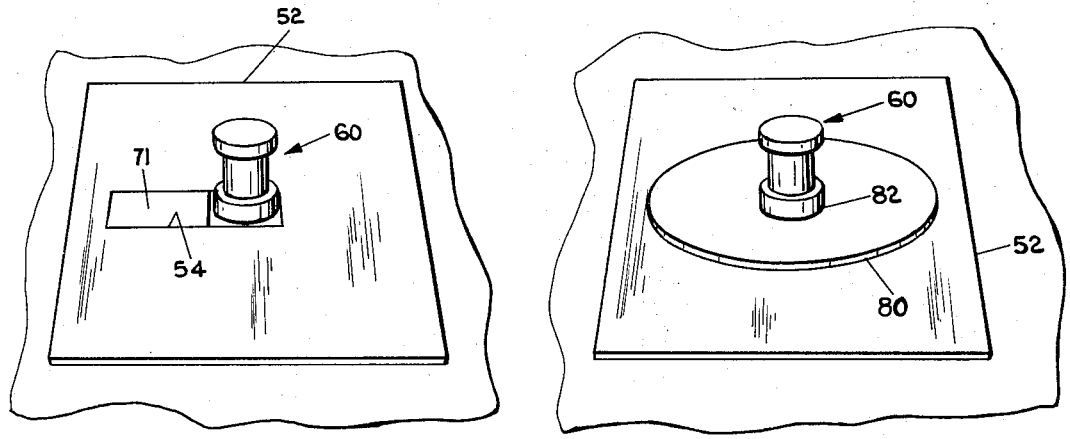
FIG. 6
FIG. 7
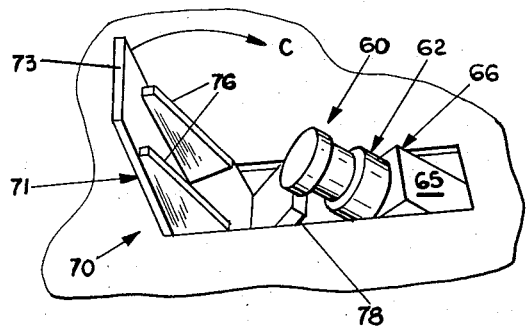
FIG. 4

KINGPIN ASSEMBLY

BACKGROUND OF THE INVENTION

The present invention relates to a kingpin assembly having a kingpin pivotally movable between upright and stored positions.

Typically, kingpins are fixedly mounted to a tractor-trailer or other vehicles for coupling the vehicle to a towing vehicle by means of a fifth wheel assembly which engages the kingpin. In most applications, the kingpin is directed downwardly, i.e., its base is fixed to a lower surface of a trailer or the like and extends downwardly therefrom. Recently however, a system has been designed for mounting a fifth wheel assembly in an inverted position onto the towed vehicle while positioning the associated kingpin in an upwardly projecting position on the towing vehicle.

When towing vehicles are multi-purpose vehicles such as pickup trucks or other general purpose vehicles, it is desired to provide hitching means which do not interfere with non-towing uses of the vehicles. In some installations, a fifth wheel is positioned in the bed of a pickup truck for towing a vehicle having a conventional kingpin. To use the truck for general hauling duties, therefore, it is necessary to remove the fifth wheel; and frequently to also remove obstructive mounting brackets for the fifth wheel. Recently designed inverted fifth wheel installations do not completely solve this problem since conventionally mounted kingpins are permanently attached to the vehicle and removal is impossible or at least difficult. With detachably mounted kingpins, the removal of the kingpin is difficult due to dirt or the like which frequently clogs the threads or other portions of the securing means employed to hold the kingpin in a detachable manner to the vehicle.

Various folding kingpin assemblies have been proposed. U.S. Pat. No. 2,494,799 entitled TRAILER COUPLING issued on Jan. 17, 1950 to W.H. Duvall, et al., describes a folding, upwardly extending kingpin assembly which has a spring and ball latch mounted on one side for locking the kingpin in an upright position. U.S. Pat. No. 2,981,555 entitled FOLDING KING PIN issued Apr. 25, 1961 to A. Abolins describes a folding kingpin which employs a sliding plate which serves as a lock for the kingpin and as a retaining member when the normally downwardly depending kingpin is raised to the stored position. U.S. Pat. No. 3,135,528 entitled FOLDING KING PIN issued on June 2, 1964 to J.J. Martin and U.S. Pat. No. 3,254,904 entitled FOLDING KING PIN issued on June 7, 1966 to R.A. Jewell also describe folding kingpin assemblies with associated locking mechanisms.

Since kingpins are subject to road dirt and other foreign matter when in use, frequently the folding-type kingpins become difficult to move between stored positions and upright positions. Thus, a well-designed folding kingpin assembly should provide means for reducing or eliminating the entry of foreign matter into the moving parts of the assembly, or alternatively, means to assist in moving the kingpin. While one of the kingpin assemblies of the prior art describes a sliding locking plate which locks a downwardly projecting kingpin in position during use and retains and partially covers the kingpin while in a horizontal stored position when not in use, the plate is not pivotally mounted and does not serve as a work surface for the vehicle on which the kingpin assembly is mounted or aid in moving the kingpin.

SUMMARY OF THE INVENTION

The kingpin assembly of the present invention is pivotally mounted in a recessed mounting bracket attached to a vehicle. The kingpin can be pivoted into the recessed area when not in use to provide a closed flat surface when the vehicle is used for other than towing applications. The pivotally mounted locking means partially covers the kingpin when stored and includes a shoulder to aid in moving the kingpin between the stored and in use positions.

Apparatus embodying the present invention comprises means for mounting a kingpin for movement between a stored position within a recess when not in use and a locked position for use. The apparatus further comprises a pivotable locking mechanism including a plate which, in a locked position specially abuts an edge of the kingpin to secure the kingpin in an upright position. When the kingpin is in its stored position within the recess, the plate of the locking mechanism pivotally closes over a portion of the kingpin to form a relatively flat surface.

The kingpin assembly of the present system has a unique construction which includes pivotable locking means which also serves as a cover plate. A member attached to the locking means aids in moving the kingpin from its stored position to overcome resistive forces of foreign material, rust or the like. None of the prior art devices incorporate such a pivotable locking means of one which provides these multi-purpose functions.

It is an object of the present invention, therefore, to provide a kingpin which is pivotable between a locked upright position and a horizontal stored position and pivotable locking means therefore.

It is an additional object of the present invention to provide a kingpin assembly which presents a relatively flat surface when the pivotable kingpin mounted therein is in a stored position.

Another object of the present invention is to provide a pivotable kingpin mounted within a recess and including a locking mechanism which serves the dual purpose of locking the kingpin in an upright position and forming a cover for a portion of the recess in which the kingpin is mounted.

Still a further object of the present invention is to provide a locking mechanism for a pivotable kingpin which includes a shoulder portion for aiding in moving the kingpin to an upright position.

These and other objects of the present invention will become apparent upon reading the following specification together with the accompany drawings.

BRIEF DESCRIPTION OF THE DRAWINGS

FIG. 1 is a fragmentary perspective view of a portion of a trailer including an inverted fifth wheel that is coupled to a kingpin mounted in the bed of a pickup truck also shown in fragmentary form;

FIG. 4 is an enlarged perspective view of the kingpin assembly with the kingpin shown in a partially raised position;

FIG. 6 is a perspective view of the kingpin assembly with the kingpin in the locked upright position; and FIG. 7 is a perspective view of the kingpin assembly with the kingpin in its upright position and a lubrication plate positioned thereover.

DETAILED DESCRIPTION OF THE PREFERRED EMBODIMENT

Figure 5:
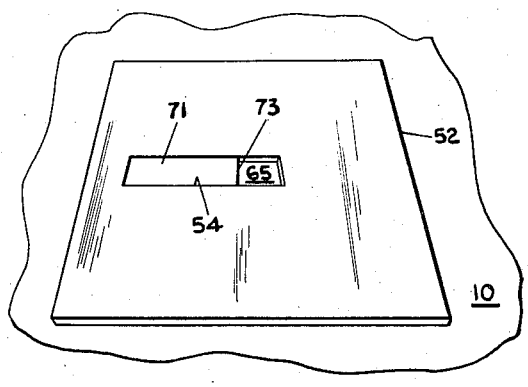
FIG. 5 is a perspective view of the kingpin assembly with the kingpin in the stored position.

Referring now in detail to the drawings, there is shown in FIG. 1, a portion of the bed 10 of a pickup truck 12 having a tailgate 14 in its lowered position to expose an inverted fifth wheel assembly 20 which is coupled to the bottom surface 31 of a fifth wheel mounting box 30 which, in turn, is attached to the lower surface 41 of a trailer 40 coupled to the bed of the pickup truck by means of a kingpin assembly 50. Only the forward overhanging portion of the trailer 40 is shown in FIG. 1, it being understood that it extends rearwardly of the pickup truck and then downwardly to the bed of the trailer. Such an arrangement is then shown in greater detail in a copending application entitled INVERTED FIFTH WHEEL ASSEMBLY filed concurrently herewith and assigned to the present assignee. This application also describes in detail the fifth wheel assembly 20 which has a single control arm 22 to provide decoupling of the self-locking fifth wheel assembly from the kingpin.

Figure 2:
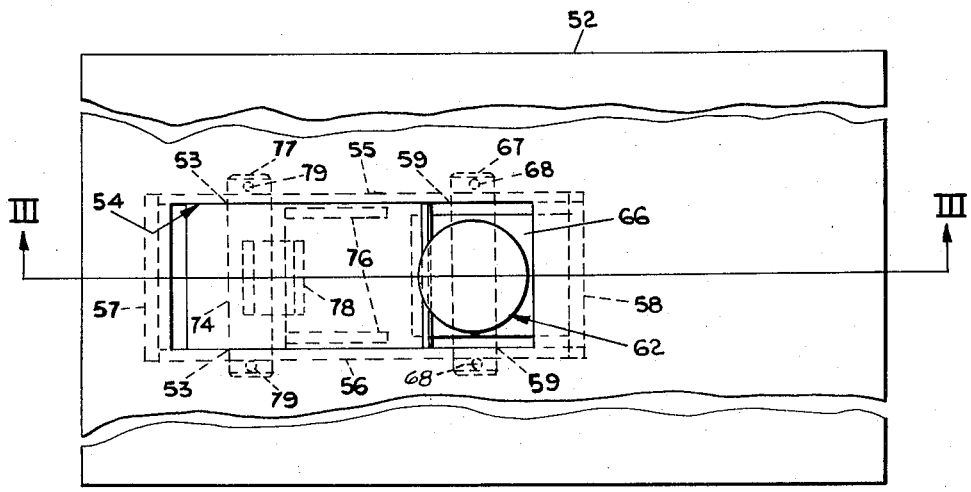
FIG. 2 is an enlarged detailed plan view of the kingpin assembly.
Figure 3:
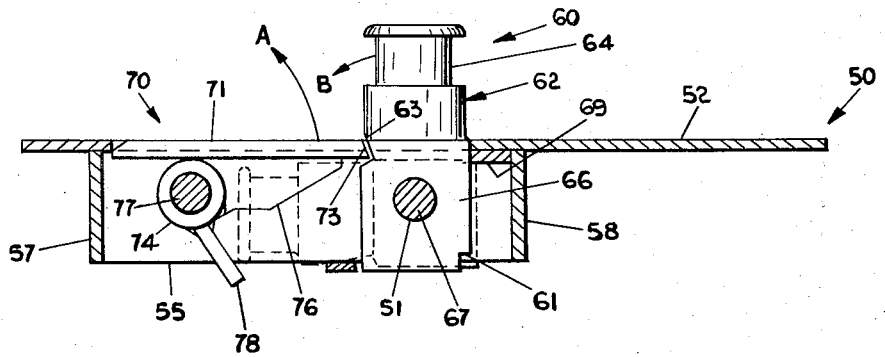
FIG. 3 is a detailed sectional view of the kingpin assembly taken along the section lines III—III of FIG. 2.

The kingpin assembly 50 is shown in detail in FIGS. 2 and 3 and comprises a base or support plate 52 having a rectangular aperture 54 generally centrally located therein. Depending downwardly from the edges of the aperture 54 are four steel plate walls 55, 56, 57 and 58. These walls are welded to the bottom edges of the aperture 54 in the mounting plate 52 and welded at the interconnecting corners of the walls. Wall 58 is set back somewhat from the edge of the aperture 54 as shown in FIG. 3. A reinforcing plate 69 is secured on the under surface of mounting plate 52 adjacent the junction of plate 52 with wall 58.

A kingpin 60 having a solid, generally cylindrical shaped body portion 62 with an annular recess 64 formed toward the top thereof is integrally formed on a rectangular base block 66 which is pivotally coupled between the walls 55 and 56 by means of a pivot pin 67 which extends through an aperture 61 in the base block 66 and apertures 57 in the walls 55 and 56. The pivot pin is secured in place by means of cotter keys 68 or the like.

A notch 61 is formed in the base block 66 of the kingpin 60 such that when the kingpin is in its lowered position (shown in the figure by the phantom line position), the notch 61 will engage the corner of plate 69. Opposite the notch 61 and above the top edge of the base block 66 of kingpin 60 is formed a notch 63 which extends the width of the cylindrical portion 62 of the kingpin and is tapered as shown to form a lock plate engaging surface that is adapted to receive a similarly tapered edge 73 of a plate 71 of the locking mechanism 70.

The plate 71 of the locking mechanism 70 is secured to a cylindrical sleeve 74 and reinforced by means of a pair of spaced support ribs 76 welded between plate 71 and sleeve 74. A shoulder member 78 comprising a section plate is welded to the bottom portion of the sleeve 74 and projects outwardly as shown in FIG. 3.

The locking mechanism 70 is pivotally coupled between the walls 55 and 56 by means of a pivot pin 77 which extends through sleeve 74 and apertures 53 in the walls 55 and 56. Pin 77 is held in place by means of cotter keys 79 or other suitable fastening means.

It is seen that when the kingpin 60 is in an upright position as shown in solid lines in FIGS. 2 and 3, the right surface 65 of block 66 abuts the edges of the mounting plate 52 and the reinforcing plate 69. The kingpin is held in this upright position by means of the plate 71 which engages the opposite side of the kingpin 60 by means of the interengaging edges 73 and 63 of the locking mechanism 70 and the kingpin 60, respectively. The slope of the tapered notch 63 and the edge 73 of the locking mechanism 70 is such that any lateral movement of the kingpin 60 tends to hold the plate 71 down in the horizontal locking position as shown in FIG. 3.

The locking mechanism 70 is positioned in the recess formed by the four walls 55 through 58 such that it can be raised in an arc indicated by the arrow A (FIG. 3) away from the kingpin such that the kingpin can then be pivotally swung in a direction indicated by the arrow B downwardly into the recess.

When the kingpin is in its partially closed position as shown in the perspective view of FIG. 4, it will contact the edge of the shoulder 78 of the locking mechanism which must then be rotated in the direction shown by the arrow C in FIG. 4. Moving plate 71 allows the kingpin to fall into its horizontal position illustrated in solid lines in FIG. 3. Plate 71 then closes over the kingpin, covering up the recess as shown in FIG. 5. Thus, the top surface of the plate 71 is substantially flush with the top surface of the mounting plate 52 while the surface 65 of the kingpin base block is exposed and slightly recessed as shown in FIG. 5.

To raise the kingpin from its closed, stored position as shown in FIG. 5, it is necessary only to grasp the edge 73 of the locking plate 71 and lift the plate upwardly until the shoulder 78 contacts the kingpin 60. By continuing the pivoting of the locking mechanism in a direction indicated by the arrow A in FIG. 3, the shoulder of the locking mechanism forces the kingpin 60 toward its upright position. This provides mechanical leverage for raising the kingpin should the pivoting mechanism become rusted or dirty during exposure to weather or road dirt. In this regard, it has been found better to leave the assembly open at the bottom so that dirt cannot accumulate around the kingpin or locking mechanism.

Once the kingpin is in its partially raised position as shown in FIG. 4, the cylindrical portion 62 of the kingpin can be grasped to raise the kingpin in its fully upright position. The locking mechanism 70 is then swung downwardly in the direction of the arrow C of FIG. 4 to its locked position as shown in FIG. 3. The locked kingpin is shown in perspective view in FIG. 6 with the locking plate 71 engaging the notch in the kingpin to securely hold it in its vertical, upright position.

A disc 80 of polymeric material having a lubricating compound such as molybdenum disulfide impregnated therein can be placed over the kingpin as shown in FIG. 7. For this purpose an aperture 82 is formed at the center of the disc to allow the kingpin to pass therethrough and the disc to rest on the plate 52.

It will become apparent to those skilled in the art that these and other modifications of the preferred embodiment can be made without departing from the spirit or scope of the present invention as defined in the following claims.

The embodiments of the invention in which an exclusive property or privilege is claimed are defined as follows:

1. A kingpin assembly adapted to be positioned on a surface of a first vehicle for coupling the first vehicle to a second vehicle having a fifth wheel thereon comprising:
   a mounting plate including an aperture formed therein and support members extending from at least two opposite sides of said aperture;
   a kingpin pivotally mounted between said support members in a manner to be movable between an upright position and a stored position, said kingpin including a notch formed along an edge thereof; and
   pivotable locking means for locking said kingpin in an upright position during use, said locking means including a plate having an edge shaped to engage and project into said notch in said kingpin to lock said kingpin in an upright position and hold said locking means in a kingpin locking position when said kingpin is in use.

2. The apparatus as defined in claim 1 wherein said plate of said pivotable locking means is pivotally mounted between said support members to cover at least a portion of said kingpin when stored.

3. A kingpin assembly adapted to be positioned on a surface of a first vehicle for coupling the first vehicle to a second vehicle having a fifth wheel thereon comprising:
   a mounting plate including an aperture formed therein and support members extending from at least two opposite sides of said aperture;
   a kingpin pivotally mounted between said support members in a manner to be movable between an upright position and a stored position; and
   pivotable locking means for locking said kingpin in an upright position during use, said locking means including a shoulder portion adapted to engage an edge of said kingpin when said locking means is pivoted from a closed to an open position thereby forcing said kingpin from its stored position.

4. A kingpin assembly comprising:
   a mounting plate having a kingpin receiving aperture formed therein;
   a kingpin;
   means for pivotally mounting said kingpin to said mounting plate such that it is movable within said aperture between an upright position in which the kingpin extends above the plate and a stored position in which the kingpin does not extend above the plate; and
   a pivotable locking member for locking said kingpin in an upright position during use, said locking member including means extending therefrom and engaging said kingpin for moving said kingpin from a stored position when said locking member is pivotally moved.

5. The apparatus as defined in claim 4 wherein said mounting means comprises a pair of members attached to said plate and positioned at opposite sides of said aperture in said plate.

6. The apparatus as defined in claim 5 wherein said mounting means further includes a pivot pin positioned between said members below said plate and through said kingpin such that when said kingpin is in an upright position, one side of said kingpin contacts an edge of said mounting plate forming a side of said aperture between said opposite sides.

7. The apparatus as defined in claim 6 wherein said locking member comprises a locking plate pivotally coupled between said pair of members and movable between a locked position in which an edge of said locking plate contacts a side of said kingpin opposite said one side of said kingpin, and an unlocked position in which said kingpin can be pivoted from its upright position.

8. The apparatus as defined in claim 7 in which said edge of said locking plate and said opposite side of said kingpin are tapered to tend to hold said locking plate against said kingpin when in said locked position.

9. The apparatus as defined in claim 8 wherein said locking plate is attached to a sleeve pivotally coupled between said pair of members by means of a second pivot pin and wherein said kingpin moving means comprises a shoulder extending from and positioned on said sleeve to contact said kingpin in its stored position when said locking plate is pivoted.

10. The apparatus as defined in claim 9 wherein said locking plate is substantially flush with said mounting plate when in a locked position and covers at least a portion of said aperture in said mounting plate.

11. A kingpin assembly comprising:
    a mounting assembly including a mounting plate adapted to be positioned on a vehicle to provide a relatively flat surface,
    a kingpin pivotally mounted to said mounting assembly and movable between an upright position for use and a stored position in which a side of said kingpin is substantially parallel to and adjacent said mounting plate, and
    locking means comprising a combined locking and cover plate pivotally mounted to said mounting assembly to be moved to a locking position in contact with said kingpin when said kingpin is in an upright position and a surface of said combined locking and cover plate is substantially flush with said mounting plate; said locking means movable from said locked position to allow said kingpin to be moved from an upright to a stored position whereupon said combined locking and cover plate covers at least a portion of said kingpin and is substantially flush with said mounting plate.

12. The apparatus as defined in claim 13 wherein said mounting plate having an aperture therein and four downwardly depending walls positioned adjacent edges of said aperture to define a recess in which said kingpin is positioned when stored.

13. A kingpin assembly comprising:
    a mounting assembly adapted to be positioned on a relatively flat surface of a vehicle, said assembly including a mounting plate having an aperture therein and four downwardly depending walls positioned adjacent edges of said aperture to define a recess in which a kingpin is positioned when stored,
    a kingpin pivotally mounted to said mounting assembly and movable between upright and stored positions, and
    locking means comprising a locking plate pivotally coupled to opposite walls of said recess to be moved to a locking position in contact with said kingpin when said kingpin is in an upright position, said locking plate movable from said locked position to allow said kingpin to be moved from an upright to a stored position, said locking plate forming a cover for at least a portion of said recess, which cover is flush with said mounting plate when said locking plate is in a locked position.

14. The apparatus as defined in claim 13 wherein said locking means further includes a shoulder adapted to contact said kingpin when in a stored position and when said locking plate is moved to force said kingpin toward an upright position.

15. In combination; a kingpin assembly adapted to be attached to a surface of a first vehicle, said assembly including a mounting plate having an aperture formed therein and support members extending from at least two opposite sides of said aperture; a kingpin pivotally mounted between said support members in a manner to be movable between an upright position through said aperture and a stored position approximately parallel to the plane of said mounting plate; pivotable locking means for locking said kingpin in an upright position during use and covering at least a portion of said kingpin when stored, said locking means including means engaging said kingpin for urging said kingpin away from a stored position when said locking means is pivoted; and a fifth wheel assembly mounted to a second vehicle adapted to be coupled to said first vehicle by coupling said fifth wheel to said kingpin.

16. The combination defined in claim 15 wherein said fifth wheel is adapted to be mounted in an inverted position on said second vehicle, and wherein said kingpin is adapted to extend upwardly from said first vehicle.

17. The combination as defined in claim 16 wherein said pivotable locking means includes a configurated edge and wherein said kingpin includes a configurated edge adapted to receive said edge of said locking means in mating engagement to maintain the kingpin in an upright position and said locking means in a locked position when the kingpin is in use.

18. The combination as defined in claim 17 wherein said pivotable locking means comprises a plate pivotally mounted between said support members.

19. The combination as defined in claim 18 wherein said engaging means comprises a shoulder extending from said plate to engage an edge of said kingpin when said locking means is pivoted from a closed to an open position thereby forcing said kingpin from its stored position.

* * * * *